US011490632B2

(12) United States Patent
Young

(10) Patent No.: US 11,490,632 B2
(45) Date of Patent: Nov. 8, 2022

(54) BITTER-BLOCKING AGENT AND PROCESS FOR MAKING SAME

(71) Applicant: TASTES NATURAL, LLC, Danbury, CT (US)

(72) Inventor: Joshua V. Young, Liberty Township, OH (US)

(73) Assignee: TASTES NATURAL, LLC, Danbury, CT (US)

( * ) Notice: Subject to any disclaimer, the term of this patent is extended or adjusted under 35 U.S.C. 154(b) by 285 days.

(21) Appl. No.: 16/160,117

(22) Filed: Oct. 15, 2018

(65) Prior Publication Data

US 2019/0045806 A1 Feb. 14, 2019

Related U.S. Application Data

(63) Continuation of application No. 15/463,413, filed on Mar. 20, 2017, now abandoned.

(60) Provisional application No. 62/402,517, filed on Sep. 30, 2016.

(51) Int. Cl.

*A23C 23/00* (2006.01)
*A23L 23/00* (2016.01)
*A23C 9/13* (2006.01)
*A23C 19/09* (2006.01)

(52) U.S. Cl.

CPC ................ *A23C 23/00* (2013.01); *A23C 9/13* (2013.01); *A23C 9/1307* (2013.01); *A23C 19/09* (2013.01); *A23C 19/0917* (2013.01); *A23L 23/00* (2016.08); *A23C 2260/05* (2013.01); *A23V 2002/00* (2013.01)

(58) Field of Classification Search

CPC ....... A23C 23/00; A23C 9/1307; A23C 9/132; A23C 19/09; A23C 19/0917; A23C 9/13; A23C 2260/05; A23L 23/00; A23V 2002/00

USPC .... 426/580, 34, 36, 250, 302, 303, 582, 583

See application file for complete search history.

(56) References Cited

U.S. PATENT DOCUMENTS

2006/0210677 A1* 9/2006 David .................. A47G 21/001 426/115
2006/0257525 A1* 11/2006 Hearn ...................... C12G 3/06 426/11
2008/0032011 A1 2/2008 Liniger et al.
2008/0209583 A1* 8/2008 Mazereeuw ............. A01H 5/08 800/260
2008/0260909 A1* 10/2008 Chung .................... A23L 19/01 426/597
2010/0092608 A1 4/2010 Gutknecht et al.
2012/0088015 A1* 4/2012 Han ........................ A23L 33/15 426/231
2012/0135109 A1* 5/2012 Paeschke ................ A23L 19/07 426/50
2018/0014550 A1 1/2018 Hoffmann

FOREIGN PATENT DOCUMENTS

CN 104855900 A 8/2015

OTHER PUBLICATIONS

NPL Joe et al. (2010) [in https://www.growingagreenerworld.com/preserving-fruit-flavors-in-alcohol-homemade-liqueurs/] (Year: 2010).*
NPL DMello S et al. (2015) [ https://www.medindia.net/patients/lifestyleandwellness/health-benefits-of-cucumber.htm] (Year: 2015).*
NPL Vodka and ethanol [Retrieved on Oct. 21, 2020], (Year: 2020).*
NPL Fruit in alcohol (2010). (Year: 2010).*
NPL Liu et al. (in Innovative Food Science and Emerging Technologies 34, 51-58,2016, available online Jan. 27, 2016). (Year: 2016).*
Prior art On line Printable History (Google scholar Search Record , Sep. 2021). (Year: 2021).*
NPL Tzatziki and raw vegetable ((See p. 6 top few lines for year: By oldworldgardenfarms Published: Jun. 20, 2014). (Year: 2014).*
Gaudette et al., “Modifying Bitterness in Functional Food Systems” in Critical Reviews in Food Science and Nutrition, 53: 464-481, 2013.

* cited by examiner

*Primary Examiner* — Donald R Spamer
*Assistant Examiner* — Bhaskar Mukhopadhyay
(74) *Attorney, Agent, or Firm* — Dilworth IP, LLC

(57) ABSTRACT

A liquid edible dip that includes a first lactose-based composition, a second lactose-based composition, at least one spice, and a cucumber extract based bitter-blocking agent that can block the bitter tastes present in certain edible foods. The cucumber extract based bitter-blocking agent can modify, reduce, or block the bitter taste present in some edible foods. The first lactose-based composition may be a strained yogurt and the second lactose-based composition may be an evaporated milk powder.

4 Claims, No Drawings

BITTER-BLOCKING AGENT AND PROCESS FOR MAKING SAME

CROSS REFERENCE TO RELATED APPLICATIONS

This application is a continuation of U.S. application Ser. No. 15/463,413 filed on Mar. 20, 2017, which claims priority to U.S. Provisional Appl. Ser. No. 62/402,517 filed on Sep. 30, 2016, each of which is incorporated by reference in its entirety.

TECHNICAL FIELD

The present disclosure generally relates to edible sauces or dips. Specifically, the present disclosure relates to dips or sauces that can modify tastes present in edible foods.

BACKGROUND

Current dips and sauces present in the market contain numerous ingredients to add or enhance flavor of edible foods that are consumed with the dips or sauces. These conventional dips and sauces are made only to add flavor to the edible foods they are eaten with. However, the currently available dips or sauces are unable to modify the taste of the edible foods.

Some edible foods high in nutritious value, such as, for example, raw vegetables, have an undesirable, bitter taste. Conventional dips and sauces may add flavor to this taste but cannot modify it. Accordingly, there exists a need for a dip that can add flavor and at the same time modify, alter, or reduce the bitter taste present in bitter edible foods.

SUMMARY

There is a need for edible dips which can provide flavor and modify, reduce, or block the bitter taste present in some edible foods. The present embodiments address this need by providing edible dips comprising a first lactose-based composition, a second lactose-based composition, at least one spice, and a cucumber extract based bitter-blocking agent that can block the bitter tastes present in certain edible foods. These embodiments can modify, reduce, or block the bitter taste present in some edible foods.

In one embodiment, a taste modifying composition may comprise a cucumber extract based bitter-blocking agent, a first lactose-based composition, a second lactose-based composition, and at least one spice. The first lactose-based composition may be present from about 55 wt. % to about 90 wt. % of the liquid edible dip. The second lactose-based composition may be present from about 10 wt. % to about 25 wt. % of the liquid edible dip. The at least one spice may be present from about 0.1 wt. % to about 5 wt. % of the liquid edible dip. The cucumber extract based bitter-blocking agent may be present from about 0.1 wt. % to 5 wt. % of the liquid edible dip.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Typically, the human tongue experiences bitter taste in response to eating uncooked or unprocessed edible foods such as raw vegetables. As used herein, "bitter taste" is used to include all unpleasant tastes to a human tongue, and specifically includes sharp, acidic, tart, sour, biting, unsweetened, pungent, tangy, or zesty tastes. These bitter tastes are perceived by the TAS2R class of proteins. TAS2R proteins have short extracellular domains and bind to ligands that have been associated with the bitter tastes of some edible foods, e.g. raw vegetables. Examples of ligands that bind to TAS2R receptors include, but are not limited to, cycloheximides, 6-n-propyl-2-thiouracil, phenylthiocarbamides, and beta-glucopyranosides.

TAS2R proteins are expressed on the circumvallate papillae, foliate papillae, fungiform papillae, filiform papillae, palate, and epiglottis taste buds. These cellular domains are located in the mouth and the TAS2R proteins—along with other TAS proteins—expressed in these cellular domains are responsible for perceived tastes. Specifically, TAS2R proteins are responsible for perceived bitter tastes.

Compounds present in some edible foods, e.g. raw vegetables, bind to the TAS2R proteins. The binding of these compounds to the TAS2R proteins corresponds to a perceived bitter taste. Liquid edible dips of the present disclosure block the binding of certain compounds present in some edible foods from binding to the TAS2R proteins. Specifically, by dipping such edible foods in the liquid edible dip, the bitter taste may be modified, reduced, or blocked due to the composition of the liquid edible dip.

Reference will now be made in detail to various embodiments of liquid edible dips described herein. The liquid edible dips may comprise a first lactose-based composition, a second lactose-based composition, at least one spice, and a cucumber extract based bitter-blocking agent.

The edible liquid dip includes the first lactose-based composition. In embodiments, the first lactose-based composition may be milk, yogurt, cream, condensed milk, ricotta, or cheese. In some embodiments, the first lactose-based composition includes a lactose composition that is fermented by bacteria. In embodiments, the lactose composition that is fermented may be yogurt or a strained, often referred to as Greek, yogurt. In other embodiments, the first lactose-based composition may be whole fat yogurt, 2% fat yogurt, 1% fat yogurt, skim yogurt, or zero-fat yogurt. In embodiments, the lactose content of the first lactose-based composition may be within a range of about 1 gram to about 20 grams per ounce. In embodiments, the weight percentage of lactose in the first lactose-based composition may be within a range of about 1 wt. % to about 20 wt. % of the first lactose-based composition.

In other embodiments, the first lactose-based composition may also include flavored yogurts including various vegetable flavors, fruit flavors, or combinations thereof. In some embodiments, the liquid edible dip may comprise a lactase-based composition instead of the first lactose-based composition so that the liquid edible dip may be consumed by lactose-intolerant users. In these embodiments, the first lactase-based composition may include yogurt made from lactaid milk, soy milk, coconut milk, almond milk, rice milk, or similar lactose-free milks.

In embodiments, the liquid edible dip comprises a first lactose-based composition having a weight percentage within a range from about 55 wt. % to about 90 wt. % of the liquid edible dip. In some embodiments, the first lactose-based composition has a weight percentage within a range from about 55 wt. % to about 80 wt. %, from about 55 wt. % to about 70 wt. %, from about 50 wt. % to about 70 wt. %, from about 50 wt. % to about 65 wt. %, or from about 55 wt. % to about 65 wt. %.

The edible liquid dip comprises a second lactose-based composition. In embodiments, the second lactose-based composition may include milk powder, milk, whey, condensed milk, cream, sour cream, or other milk substitutes known in the art. In embodiments, the percentage of lactose in the second lactose-based composition may be within a range of about 20 wt. % to about 85 wt. % of the second lactose-based composition. In embodiments where the second lactose-based composition is milk powder, milk may be evaporated to dryness to produce the milk powder.

In some embodiments, a second lactase-based composition may be used instead of the second lactose-based composition. The second lactase-based composition may be used when the milk powder is obtained from lactaid milk, soy milk, almond milk, coconut milk, or similar lactose-free milks.

The second lactose-based composition may include milk powder obtained from whole milk, nonfat or skim milk, dry milk, butter milk, dry whey products, dry dairy blends, or similar products known in the art. In some embodiments, the second lactose-based composition may be buttermilk buds. In other embodiments, a combination of evaporated milk powder and buttermilk buds may be used. In embodiments, the liquid edible dip comprises second lactose-based composition having a weight percentage within a range from about 10 wt. % to about 25 wt. % of the liquid edible dip. In some embodiments, the liquid edible dip comprises the second lactose-based composition having a weight percentage within a range from about 15 wt. % to about 25 wt. %, from about 16 wt. % to about 20 wt. %, or from about 17 wt. % to about 19 wt. % of the liquid edible dip.

The liquid edible dip comprises at least one spice. In embodiments, the at least one spice may include clove, cinnamon, basil, thyme, rosemary, cardamom, cumin, bay leaf, fenugreek, paprika, garlic, ginger, nutmeg, parsley, dill, black pepper, white pepper, cayenne pepper, basil or combinations thereof. In embodiments, the one or more spices may be in the form of grating, extract, paste, flakes, or a combination thereof. In embodiments, the liquid edible dip includes the one or more spices cumulatively having a weight percentage within a range from about 0.1 wt. % to about 5 wt. % of the liquid edible dip. Further, in some embodiments, the cumulative weight percentage of the one or more spices is within a range from about 0.5 wt. % to about 3 wt. %, from about 0.6 wt. % to about 2 wt. %, from about 0.7 wt. % to about 1.1 wt. %, from about 0.8 wt. % to about 1.2 wt. %, or from about 0.9 wt. % to about 1.5 wt. % of the liquid edible dip.

In one or more embodiments, the cucumber extract based bitter-blocking agent is isolated from cucumbers of cucurbitaceae plant family. In embodiments, the cucumber extract based bitter-blocking agent is isolated from slicing cucumbers, pickling cucumbers, burpless cucumbers, or combinations thereof.

The cucumber extract based bitter-blocking agent is isolated from cucumbers by immersing them in an ethanol and water mixture. The cucumbers, ethanol, and water are then finely blended with a high shear mixer. The resulting composition is filtered and then heated to above 120 degrees Fahrenheit (° F.). The resulting solution is a cucumber extract based bitter-blocking agent capable of blocking the binding of some ligands to TAS2R proteins.

In embodiments, the liquid edible dip comprises a cucumber extract based bitter-blocking agent from about 0.1 wt. % to about 5 wt. % of the liquid edible dip. In other embodiments, the weight percentage of the cucumber extract is within a range from about 0.2 wt. % to about 4.5 wt. %, from about 0.3 wt. % to about 4 wt. %, from about 0.4 wt. % to about 3.5 wt. %, from about 0.5 wt. % to about 3 wt. %, or from about 0.3 wt. % to about 0.5 wt. % of the liquid edible dip.

The liquid edible dip may further comprise one or more flavoring agents. The one or more flavoring agents may include flavors such as natural flavors, artificial flavors, fruit flavor, plant flavor, herb flavor, tea flavor, root flavor, fruit skin flavor, vegetable oil flavor, vegetable fat flavor, vegetable skin flavor, vegetable flavor, and the like. Specifically, natural flavors include various extract and/or juices of fruits, vegetables, herbs, and the like. Further, artificial flavors include artificially synthesized fruit flavor, plant flavor, herb flavor, tea flavor, root flavor, fruit skin flavor, vegetable oil flavor, vegetable fat flavor, vegetable skin flavor, vegetable flavor, and the like. In one or more embodiments, the one or more flavoring agents may also include one or more condiments such as chili oil, chili sauce, chutney, honey dill, ketchup, hot sauce, mustard, olive oil, mustard oil, soy sauce, vinegar, and the like. In embodiments, the liquid edible dip comprises one or more flavoring agents cumulatively having a weight percentage within a range from about 5 wt. % to about 15 wt. %. In some embodiments, the one or more flavoring agents may have a weight percentage from about 6 wt. % to about 12 wt. %, from about 7 wt. % to about 11 wt. %, or from about 8 wt. % to about 10 wt. % of the liquid edible dip.

The liquid edible dip may further comprise one or more food additives. In embodiments, the one or more food additives are added to enhance the taste and appearance of the liquid edible dip. In some embodiments, known natural and artificial additives may be used. The one or more food additives include acidity regulators, anti-caking agents, anti-foaming agents, bulking agents, food coloring agents, color retention agents, emulsifiers, stabilizers, thickeners, fungicide and the like known and presently used in the art. In embodiments, the liquid edible dip includes the one or more food additives cumulatively having a weight percentage within a range from about 0.1 wt. % to about 3 wt. %. In some embodiments, the one or more flavoring agents may have a weight percentage from about 0.2 wt. % to about 1.8 wt. %, from about 0.4 wt. % to about 1.5 wt. %, or from about 0.8 wt. % to about 1 wt. % of the liquid edible dip.

The liquid edible dip may further comprise one or more preservatives to increase the shelf life of the liquid edible dip. In embodiments, the one or more preservatives may be artificial preservatives, natural preservatives, or combinations thereof. In some embodiments, the one or more artificial preservatives comprise ascorbic acid, hydroxybenzoate, sorbic acid, sodium sorbate, disodium EDTA, citric acid, tartaric acid, lecthin, acetic acid, or combinations thereof. By way of non-limiting examples, the one or more natural preservatives may include olive oil, castor oil, rosemary extract, hops, salt, sugar, or combinations thereof. In embodiments, the liquid edible dip comprises one or more preservatives cumulatively having a weight percentage within a range from about 0.5 wt. % to about 2 wt. %. In some embodiments, the one or more preservatives may cumulatively have a weight percentage from about 0.7 wt. % to about 1.8 wt. %, from about 0.9 wt. % to about 1.5 wt. %, or from about 1 wt. % to about 1.2 wt. % of the liquid edible dip.

In embodiments, the liquid edible dip may further comprise water to maintain the consistency of the dip. In some embodiments, the liquid edible dip may comprise distilled water. In other embodiments, the liquid edible dip may comprise spring water, natural water, tap water, brine water, fresh water, distilled water, or combinations thereof. In embodiments, water in the liquid edible dip may have a weight percentage from about 1 wt. % to about 20 wt. % of the liquid edible dip. In other embodiments, water in the liquid edible dip may have a weight percentage within a range from about 2 wt. % to about 15 wt. %, from about 3 wt. % to about 10 wt. %, from about 4 wt. % to about 8 wt. %, or from about 4.5 wt. % to about 6 wt. %.

In one or more embodiments, a high temperature, short time activation process may be applied to the liquid edible dip. The liquid edible dip may be subjected to temperatures above 160° F. for durations of less than five minutes. Without being limited by theory, it is believed that in addition to pasteurization, this high temperature, short time activation process enhances the ability of the cucumber extract based bitter-blocking agent to inhibit ligand binding to TAS2R proteins.

EXAMPLES

The following examples illustrate one or more additional features of the present disclosure described supra. It should be understood that these examples are not intended to limit the scope of the disclosure or the appended claims in any manner.

A cucumber extract based bitter-blocking agent was isolated using cucumbers from the cucurbitaceae family. Approximately one hundred pounds of cucurbitaceae cucumber rinds and pulp were immersed in 3785 liters of an ethanol and water solution. The ethanol and water solution comprised about 51 wt. % ethanol and about 49 wt. % water. The cucumbers, ethanol, and water were blended in a high shear mixer for 15 minutes and left to rest for 10 hours. The resulting mixture was then filtered and subsequently heated to 155° F. for 120 seconds. This process yielded about one pound of cucumber extract based bitter-blocking agent.

A strained yogurt, as a first lactose-based composition, was combined with a mixture of evaporated milk powder and buttermilk buds as a second lactose-based composition. Garlic powder, onion powder, dill, parsley flakes, black pepper, white pepper, and cayenne pepper were added to the first and second lactose-based compositions. Subsequently, olive oil and soy sauce, acetic acid, salt, and distilled water were added to the mixture. Finally, a cucumber extract based bitter-blocking agent, as described supra was added to the mixture. The mixture was then blended in a high shear mixture for 16 minutes. The resulting liquid edible dip was heated to a temperature of 172° F. for 45 seconds. A summary of the composition of ingredients of the liquid edible dip is detailed in Table 1.

TABLE 1

| Ingredient | Weight Percentage of Liquid Edible Dip |
|---|---|
| first lactose-based composition | 60 |
| second lactose-based composition | 18 |
| one or more spices | 1.0 |
| cucumber extract-based bitter-blocking agent | 0.5 |
| one or more flavoring agents | 10 |
| one or more preservatives | 1.5 |
| distilled water | 4.0 |
| one or more food additives | 2.5 |

Having described the subject matter of the present disclosure in detail and by reference to specific embodiments, it is noted that the various details described in this disclosure should not be taken to imply that these details relate to elements that are essential components of the various embodiments described in this disclosure. Rather, the claims appended infra should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

I claim:

1. A process comprising:

(a) blending at high shear a mixture of cucumber and aqueous ethanol, thereby forming a blended stream containing liquid and cucumber solids, wherein the cucumber is from the Cucurbitaceae plant family;

(b) filtering the mixture from step (a) to separate a liquid filtrate from the cucumber solids;

(c) heating the filtrate from step (b) at a temperature above 120° F. to produce a bitter-blocking agent;

(d) combining the bitter-blocking agent with at least one of a first lactose-based composition selected from milk, yogurt, cream, condensed milk, ricotta or cheese, and a second lactose-based composition selected from milk powder, milk, whey, condensed milk, cream, or sour cream, thereby forming a bitter-blocking dip, wherein the bitter-blocking agent is present in an amount from 0.1 wt. % to 5 wt % based on the total weight of the bitter-blocking dip.

2. The process of claim 1 further comprising combining the bitter-blocking agent with a spice selected from selected from clove, cinnamon, basil, thyme, rosemary, cardamom, cumin, bay leaf, fenugreek, paprika, garlic, ginger, nutmeg, parsley, dill, black pepper, white pepper, cayenne pepper, basil or combinations thereof, thereby forming a bitter-blocking dip.

3. The process of claim 2 further comprising:

(e) combining the bitter-blocking dip with an edible food.

4. The process of claim 3 wherein the edible food is a raw vegetable.

* * * * *